US008834127B2

(12) United States Patent
Giguere et al.

(10) Patent No.: US 8,834,127 B2
(45) Date of Patent: Sep. 16, 2014

(54) EXTENSION FOR ROTOR BLADE IN WIND TURBINE

(75) Inventors: Philippe Giguere, Simpsonville, SC (US); Stefan Herr, Greenville, SC (US); Peter James Fritz, Greenville, SC (US); Scott Gabell Riddell, Greer, SC (US); Jeffrey Eric Bergman, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 13/228,650

(22) Filed: Sep. 9, 2011

(65) Prior Publication Data

US 2012/0141269 A1 Jun. 7, 2012

(51) Int. Cl.
*F03D 1/06* (2006.01)
*F03D 7/02* (2006.01)

(52) U.S. Cl.
CPC ............. *F03D 7/0232* (2013.01); *Y02E 10/723* (2013.01); *Y02E 10/721* (2013.01); *F03D 1/0633* (2013.01); *F05B 2240/30* (2013.01)
USPC .......................................... 416/228; 416/62

(58) Field of Classification Search
USPC ........ 416/1, 62, 146 R, 228, 229 R, 235, 237; 29/889.21, 889.6
See application file for complete search history.

(56) References Cited

U.S. PATENT DOCUMENTS

| 175,355 A | 3/1876 | King |
| 573,562 A | 12/1896 | Wittram |
| 1,861,065 A | 5/1932 | Poot |
| RE19,412 E | 1/1935 | Zaparka |
| 2,071,012 A | 2/1937 | Adams |
| 2,225,312 A | 12/1940 | Mason |
| 2,238,749 A | 4/1941 | Peltier |
| D131,271 S | 2/1942 | Colura |

(Continued)

FOREIGN PATENT DOCUMENTS

| DE | 102006043462 | 3/2008 |
| EP | 0 652 367 | 5/1995 |

(Continued)

OTHER PUBLICATIONS

Risoe National Laboratory for Sustainable Energy, "Controllable Rubber Trailing Edge Flap May Ease Stress on Wind Turbine Blades". Renewable Energy World.com, pp. 1-3, Feb. 17, 2010.

(Continued)

*Primary Examiner* — Ned Landrum
*Assistant Examiner* — Liam McDowell
(74) *Attorney, Agent, or Firm* — Dority & Manning, P.A.

(57) ABSTRACT

A rotor blade assembly for a wind turbine and a method for increasing a loading capability of a rotor blade within a maximum load limit for a wind turbine are disclosed. The rotor blade assembly includes a rotor blade having surfaces defining a pressure side, a suction side, a leading edge, and a trailing edge extending between a tip and a root. The rotor blade assembly further includes an extension connected to a surface of the rotor blade, the extension having at least one design characteristic configured for increasing a loading capability of the rotor blade within a maximum load limit for the wind turbine. The design characteristic is one of extension length, extension width, extension curvature, span-wise extension location, chord-wise extension location, or extension angle with respect to a chord line of the rotor blade.

16 Claims, 4 Drawing Sheets

(56) References Cited

U.S. PATENT DOCUMENTS

| | | | |
|---|---|---|---|
| 2,312,219 A | 4/1943 | Sensenich | |
| 2,469,167 A | 5/1949 | Little | |
| 2,899,128 A | 8/1959 | Vaghi | |
| 4,089,618 A | 5/1978 | Patel | |
| 4,204,629 A | 5/1980 | Bridges | |
| 4,618,313 A | 10/1986 | Mosiewicz | |
| 4,720,244 A | 1/1988 | Kluppel et al. | |
| 4,962,826 A | 10/1990 | House | |
| 5,088,665 A | 2/1992 | Vijgen et al. | |
| 5,320,491 A | 6/1994 | Coleman et al. | |
| 5,328,329 A | 7/1994 | Monroe | |
| 5,492,448 A * | 2/1996 | Perry et al. | 416/62 |
| 5,522,266 A | 6/1996 | Nicholson et al. | |
| 5,533,865 A | 7/1996 | Dassen et al. | |
| 5,819,357 A | 10/1998 | Gould | |
| 6,352,601 B1 | 3/2002 | Ray | |
| 6,491,260 B2 | 12/2002 | Borchers et al. | |
| 6,729,846 B1 | 5/2004 | Wobben | |
| 6,733,240 B2 | 5/2004 | Gilebe | |
| 6,779,978 B2 | 8/2004 | Camargo | |
| 6,789,769 B2 | 9/2004 | Mau et al. | |
| 6,830,436 B2 | 12/2004 | Shibata et al. | |
| 6,966,758 B2 * | 11/2005 | Grabau et al. | 416/229 R |
| 7,059,833 B2 | 6/2006 | Stiesdal et al. | |
| 7,328,770 B2 | 2/2008 | Owens et al. | |
| 7,351,041 B2 | 4/2008 | Uselton et al. | |
| 7,413,408 B1 | 8/2008 | Tafoya | |
| 7,458,777 B2 | 12/2008 | Herr | |
| 7,632,068 B2 | 12/2009 | Bak et al. | |
| 7,637,721 B2 | 12/2009 | Driver et al. | |
| 7,740,206 B2 | 6/2010 | Eaton et al. | |
| 7,828,523 B2 * | 11/2010 | Bonnet | 416/1 |
| 7,976,276 B2 | 7/2011 | Riddell et al. | |
| 7,976,283 B2 | 7/2011 | Huck | |
| 8,011,887 B2 * | 9/2011 | Fisher et al. | 416/23 |
| 8,052,394 B2 * | 11/2011 | Petsche et al. | 416/235 |
| 8,083,488 B2 | 12/2011 | Fritz | |
| 8,192,161 B2 * | 6/2012 | Baker et al. | 416/23 |
| 8,267,657 B2 | 9/2012 | Huck et al. | |
| 8,317,479 B2 * | 11/2012 | Vronsky et al. | 416/196 R |
| 2001/0008032 A1 | 7/2001 | Llewellyn-Jones et al. | |
| 2003/0175121 A1 | 9/2003 | Shibata et al. | |
| 2004/0253114 A1 | 12/2004 | Gunneskov et al. | |
| 2007/0025858 A1 | 2/2007 | Driver et al. | |
| 2007/0041823 A1 | 2/2007 | Miller | |
| 2007/0065290 A1 | 3/2007 | Herr | |
| 2007/0077150 A1 | 4/2007 | Llorente Gonzalez | |
| 2007/0294848 A1 | 12/2007 | Dumler | |
| 2008/0001363 A1 | 1/2008 | Bhate | |
| 2008/0061192 A1 | 3/2008 | Sullivan | |
| 2008/0080977 A1 | 4/2008 | Bonnet | |
| 2008/0107540 A1 | 5/2008 | Bonnet | |
| 2008/0166241 A1 | 7/2008 | Herr et al. | |
| 2008/0187442 A1 | 8/2008 | Standish et al. | |
| 2008/0298967 A1 | 12/2008 | Gil et al. | |
| 2009/0016891 A1 | 1/2009 | Parsania et al. | |
| 2009/0074585 A1 | 3/2009 | Koegler et al. | |
| 2009/0097976 A1 | 4/2009 | Driver et al. | |
| 2009/0104038 A1 | 4/2009 | Grabau | |
| 2009/0126131 A1 | 5/2009 | Delaere et al. | |
| 2009/0274559 A1 | 11/2009 | Petsche et al. | |
| 2010/0028161 A1 | 2/2010 | Vronsky et al. | |
| 2010/0068042 A1 | 3/2010 | Brück et al. | |
| 2010/0101037 A1 | 4/2010 | Gross et al. | |
| 2010/0104436 A1 | 4/2010 | Herr et al. | |
| 2010/0329879 A1 | 12/2010 | Presz, Jr. et al. | |
| 2011/0018282 A1 | 1/2011 | Hayashi et al. | |
| 2011/0042524 A1 | 2/2011 | Hemmelgarn et al. | |
| 2011/0142637 A1 | 6/2011 | Riddell et al. | |
| 2011/0142666 A1 | 6/2011 | Drobietz et al. | |
| 2011/0223030 A1 | 9/2011 | Huck et al. | |
| 2012/0027590 A1 | 2/2012 | Bonnet | |

FOREIGN PATENT DOCUMENTS

| | | |
|---|---|---|
| EP | 2028366 | 2/2009 |
| EP | 2053240 | 4/2009 |
| EP | 2138714 | 12/2009 |
| EP | 2216545 | 8/2010 |
| EP | 2253838 | 11/2010 |
| EP | 2270312 | 1/2011 |
| JP | 2000120524 | 4/2000 |
| JP | 2003254225 | 9/2003 |
| WO | WO 98/21091 | 5/1998 |
| WO | WO 2004/088130 | 10/2004 |
| WO | WO 2008/035149 | 3/2008 |
| WO | WO 2008/113349 | 9/2008 |
| WO | WO 2008/131800 | 11/2008 |
| WO | WO 2009/025549 | 2/2009 |

OTHER PUBLICATIONS

Risoe National Laboratory for Sustainable Energy, "Successful Wind Tunnel Test of Controllable Rubber Trailing Edge Flap for Wind Turbine Blades". Science Daily, pp. 1-2, Feb. 19, 2010.

Risoe National Laboratory for Sustainable Energy, The Technical University of Denmark, "Flexible Trailing Edge Flap for Blades to Make Wind PPower Cheaper". Science Daily, pp. 1-2, Apr. 7, 2011.

* cited by examiner

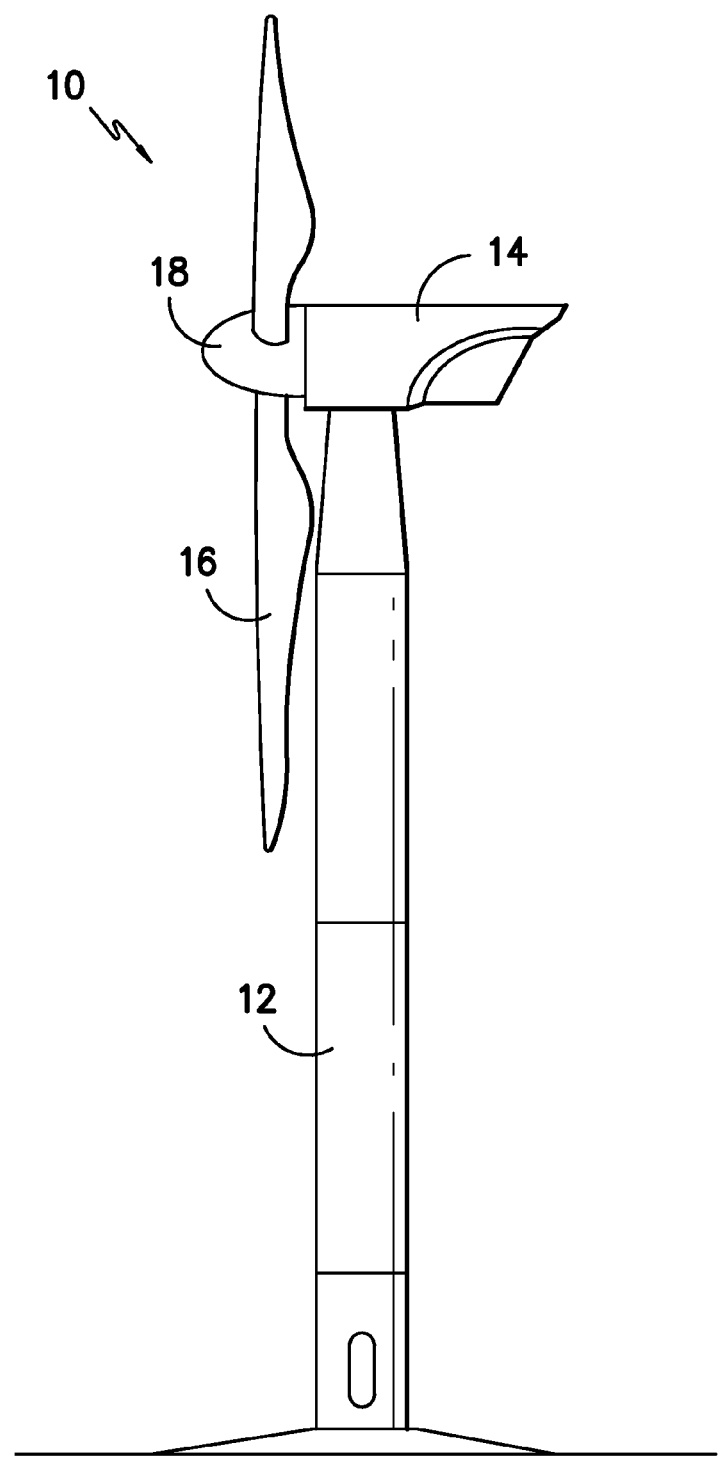
FIG. -1-
PRIOR ART

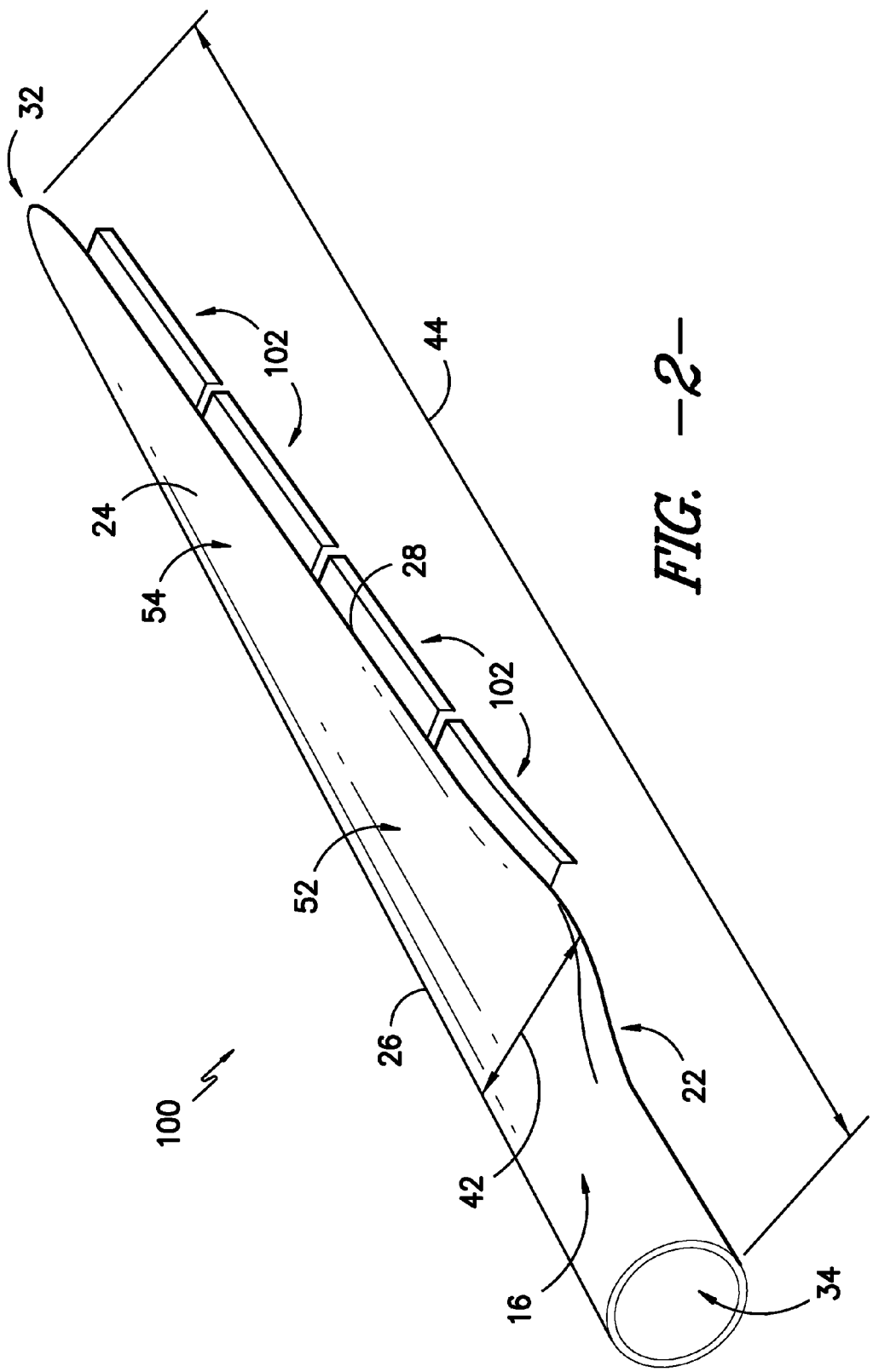
FIG. -2-

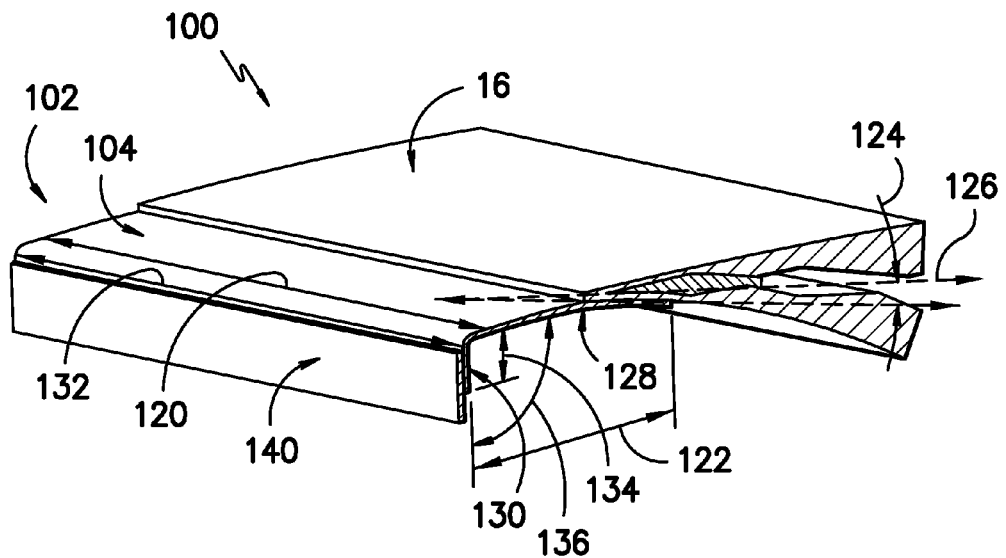
FIG. —3—
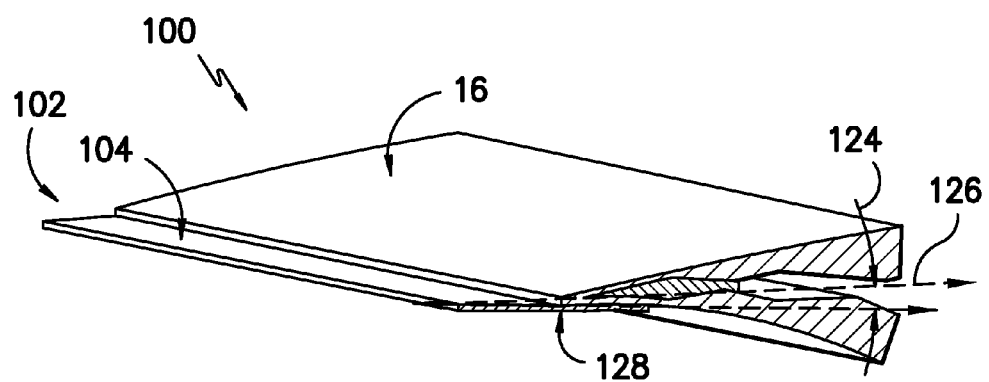
FIG. —4—

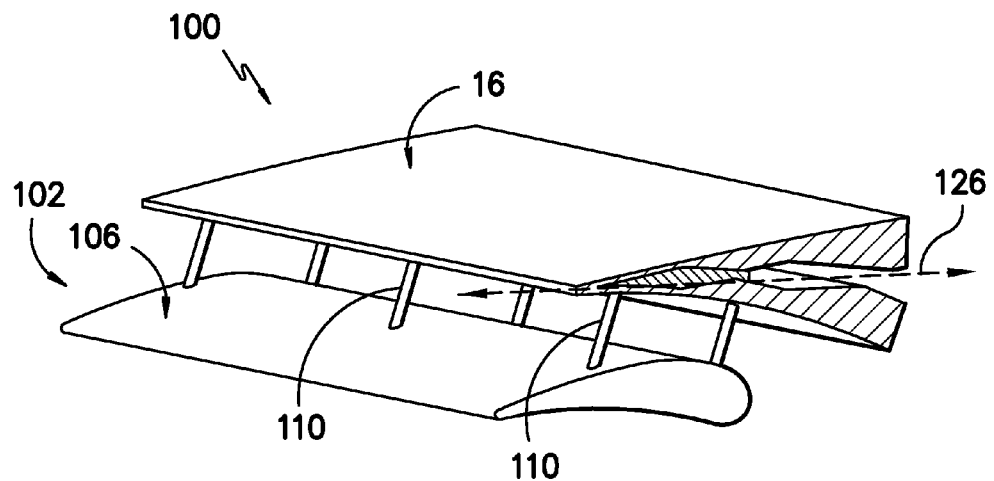
FIG. -5-
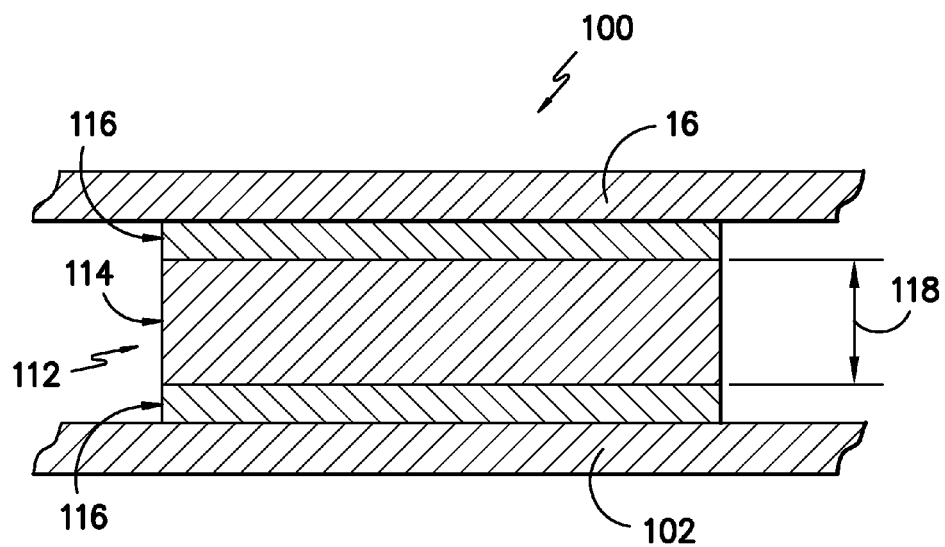
FIG. -6-

EXTENSION FOR ROTOR BLADE IN WIND TURBINE

FIELD OF THE INVENTION

The present disclosure relates in general to wind turbine rotor blades, and more particularly to extensions connected to rotor blades for enhancing the loading capabilities of the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Frequently, wind turbines are designed and/or operated with excess design margins, such as excess loading margins. For example, the maximum loading of the rotor blades may be less than the maximum loading that other various components of the wind turbine can withstand. This may result from the use of dated design parameters for certain components relative to other components, operation of the wind turbines in lower loading environments than those for which the wind turbine was originally designed, or other design or operational factors.

Recently, attempts have been made to increase the loading capabilities of rotor blades. For example, flaps have been mounted to the pressure side and/or suction side of a rotor blade. The flaps effectively increase the surface area of the pressure side and/or suction side, thus increasing the lift of the rotor blades. However, such attempts to increase loading capabilities do not take into account, and thus take advantage of, the excess design margins for and maximum load limits of the wind turbines. Thus, in lower loading environments or other situations, the full loading potential of the wind turbine is not maximized.

Accordingly, improved apparatus for increasing the loading capabilities of wind turbine rotor blades would be desired. For example, apparatus that allow for loading of wind turbine rotor blades within and up to a maximum load limit for the wind turbine would be desired.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade assembly includes a rotor blade having surfaces defining a pressure side, a suction side, a leading edge, and a trailing edge extending between a tip and a root. The rotor blade assembly further includes an extension connected to a surface of the rotor blade, the extension having at least one design characteristic configured for increasing a loading capability of the rotor blade within a maximum load limit for the wind turbine. The design characteristic is one of extension length, extension width, extension curvature, span-wise extension location, chord-wise extension location, or extension angle with respect to a chord line of the rotor blade.

In another embodiment, a method for increasing a loading capability of a rotor blade within a maximum load limit for a wind turbine is disclosed. The method includes connecting an extension to a surface of a rotor blade. The extension has at least one design characteristic configured for increasing the loading capability of the rotor blade within the maximum load limit for the wind turbine. The wind turbine is located in a low loading environment relative to the maximum load limit for the wind turbine. The method further includes rotating the rotor blade on the wind turbine. The design characteristic is one of extension length, extension width, extension curvature, span-wise extension location, chord-wise extension location, or extension angle with respect to a chord line of the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is a top view of a rotor blade assembly according to one embodiment of the present disclosure;

FIG. 3 is a perspective view of a rotor blade assembly according to one embodiment of the present disclosure;

FIG. 4 is a perspective view of a rotor blade assembly according to one embodiment of the present disclosure;

FIG. 5 is a perspective view of a rotor blade assembly according to one embodiment of the present disclosure; and, FIG. 6 is a cross-sectional view of a rotor blade assembly according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include exterior surfaces defining a pressure side 22 and a suction side 24 (see FIGS. 3 through 5) extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord may be defined for the rotor blade 16 at any point on the rotor blade 16 along the span 44.

Additionally, the rotor blade 16 may define an inner board area 52 and an outer board area 54. The inner board area 52 may be a span-wise portion of the rotor blade 16 extending from the root 34. For example, the inner board area 52 may, in some embodiments, include approximately 33%, 40%, 50%, 60%, 67%, or any percentage or range of percentages therebetween, or any other suitable percentage or range of percentages, of the span 44 from the root 34. The outer board area 54 may be a span-wise portion of the rotor blade 16 extending from the tip 32, and may in some embodiments include the remaining portion of the rotor blade 16 between the inner board area 52 and the tip 32. Additionally or alternatively, the outer board area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2 through 6, the present disclosure may further be directed to a rotor blade assembly 100. The rotor blade assembly 100 may include one or more extensions 102 and the rotor blade 16. In general, the extensions 102 may be connected to a surface of the rotor blade 16, and may increase the loading capability, and thus the lift capability, of the rotor blade 16 during operation of the wind turbine 10. In an exemplary embodiment of the present disclosure, an extension 102 may be connected to a surface of the rotor blade 16 adjacent the trailing edge 28 of the rotor blade 16. Alternatively, an extension 102 may be connected to a surface of the rotor blade 16 adjacent the leading edge 26 of the rotor blade 16, or adjacent the tip 32 or the root 34 of the rotor blade 16, or at any other suitable position on the rotor blade 16.

In exemplary embodiments, as shown in FIG. 2, an extension 102 may be connected to the pressure side 22 of the rotor blade 16. In alternative embodiments, an extension 102 may be connected to the suction side 24.

In some embodiments, a rotor blade assembly 100 may include only one extension 102 connected to a rotor blade 16. In other embodiments, a rotor blade assembly 100 may include a plurality of extensions 102 connected to a rotor blade 16, as shown in FIG. 2. For example, in some embodiments, a plurality of extensions 102 may be mounted in a generally span-wise array along at least a portion of the span 44 of the rotor blade 16. These extensions 102 may abut one another or be spaced apart from one another in the generally span-wise direction. p An extension 102 according to the present disclosure may, in some embodiments as shown in FIGS. 2 through 4, be an extension plate 104. The extension plate 104 may be partially or entirely curvilinear in the generally chord-wise direction as shown in FIG. 3, or planer in the generally chord-wise direction as shown in FIG. 4. Alternatively, an extension 102 according to the present disclosure may, in some embodiments, as shown in FIG. 5, be an auxiliary airfoil section or sections 106. The auxiliary airfoil section 106 may include a pressure side, suction side, leading edge, and trailing edge, and thus have a generally aerodynamic contour, as shown.

Extensions 102 according to the present disclosure may be connected to the rotor blade 16 through any suitable apparatus or methods. For example, in some embodiments as shown in FIG. 5, an extension 102 may be spaced from the rotor blade 16 and connected to the rotor blade 16 using suitable connecting apparatus. Such connecting apparatus may be rods 110, frames, or any other apparatus suitable for connecting an extension 102 to the rotor blade 16 while maintaining desired spacing therebetween.

Alternatively, an extension 102 may be mounted to the rotor blade 16. In some embodiments, mechanical fasteners such as nut/bolt combinations, nails, screws, rivets, or other suitable mechanical fasteners may be utilized to mount an extension to the rotor blade 16. In other embodiments, apparatus such as hinges, in particular piano hinges, may be utilized to mount the extension to the rotor blade 16. In other embodiments, hook-and-loop fasteners or other suitable fasteners may be utilized. In still other embodiments, as shown in FIGS. 3, 4, and 6, a bond layer 112 may be disposed between the extension 102 and the rotor blade 16. The bond layer 112 bonds the extension to the rotor blade 16, thus mounting the extension to the rotor blade 16.

Bond layer 112 may in general be any suitable adhesive or bonding material. In some embodiments, the bond layer 112 may have various characteristics for reducing the strain associated with mounting the extension 102 to the rotor blade 16. The bond layer 112 may thus at least partially absorb strain from the rotor blade 16 and prevent this strain from being transmitted to the extension 102, and may be formed from materials that are relatively flexible and relatively tough. In exemplary embodiments, the bond layer 112 may generally isolate the strain associated with the rotor blade 16. By generally isolating the strain, the bond layer 112 may generally prevent a relatively substantial portion of the rotor blade 16 strain from being transmitted through the bond layer 112 to the extension 102.

In some embodiments, for example, the bond layer 112 may be relatively elastic, and may thus have a relatively low shear modulus. The shear modulus may be determined over suitable environmental conditions or ranges of environmental conditions generally expected for a wind turbine 10. For example, in some embodiments, the shear modulus of the bond layer 112 may be approximately equal to or less than 5 gigapascals. In other embodiments, the bond layer 112 may have a shear modulus approximately less than or equal to 3 gigpascals, 1 gigapascal, 500 megapascals, 300 megapascals, 100 megapascals, 20 megapascals, or 10 megapascals. The relatively low shear modulus of the bond layer 112 may advantageously allow the bond layer 112 to absorb strain from the rotor blade 16 and reduce or prevent the strain being transmitted through the bond layer 112 to the extension 102.

Further, in some embodiments, the bond layer 112 may have a relatively low durometer. For example, the durometer of the bond layer 112 may be approximately less than or equal to 100, 90, 80, 70, or 60. The relatively low durometer of the bond layer 112 may advantageously allow the bond layer 112 to absorb strain from the rotor blade 16 and reduce or prevent the strain being transmitted through the bond layer 112 to the extension 102.

In some embodiments, the bond layer 112 may comprise an epoxy, polyurethane, methacrylate such as methyl methacrylate or another suitable methacrylate, or an acrylic. In embodiments wherein the bond layer 112 is an acrylic, the acrylic may be an acrylic foam, such as a closed cell acrylic foam, or any acrylic solid or non-foam.

In some embodiments, as shown in FIG. 6, the bond layer 112 may include an inner layer 114 and a plurality of outer layers 116. The inner layer 114 may be disposed between the opposing outer layers 116. The inner layer 114 may comprise, for example, an epoxy, a polyurethane, a methacrylate, or an acrylic. In exemplary embodiments, the inner layer 114 is an acrylic foam. Further, the acrylic foam may be a closed cell acrylic foam.

The inner layer 114 may define a thickness 118. In some embodiments, such as when the inner layer 114 is an inner acrylic foam layer, the thickness 118 may be in the range between approximately 0.1 millimeters and approximately 10 millimeters. Alternatively, the thickness 118 may be in the range between approximately 0.3 millimeters and approximately 10 millimeters, or in the range between approximately 0.3 millimeters to approximately 3 millimeters, or in the range between approximately 0.5 millimeters and approximately 10 millimeters, or in the range between approximately 0.5 millimeters and approximately 3 millimeters, or in the range between approximately 0.6 millimeters and approximately 3 millimeters, or in the range between approximately 0.6 millimeters and approximately 1 millimeter.

The outer layers 116 may generally be configured to mount the extension 102 to the rotor blade 16. In exemplary embodiments, the outer layers 116 comprise adhesives and are outer adhesive layers. For example, in some exemplary embodiments, the outer layers 116 may comprise acrylic adhesives. The adhesives are generally disposed on the outer surfaces of the outer layers 116 to adhere to, for example, the extension 102 and/or rotor blade 16. The inner layer may generally be coated to the inner surfaces of the outer layers to form the bond layer 112.

Extensions 102 according to the present disclosure have one or more design characteristics that are configured for increasing the loading capability of the rotor blade 16. In other words, such design characteristics increase the lift capability and thus the loading capability of the rotor blade 16 to which the extension 102 is connected. Further, the design characteristics are configured for increasing the loading capability within an established maximum load limit for the wind turbine 10. The maximum load limit may be established during design, manufacture, and/or operation of the rotor blade 16 and wind turbine 10, and establishes the maximum total loading capability, typically with a built in factor of safety, for the wind turbine.

For example, the maximum load limit may be established, and the total loading capability of the rotor blades 16 without extensions 102 may be less than this maximum load limit. This prevents damage to the wind turbine 10 during operation thereof. Due to the use of dated design parameters or the operation of the wind turbines in lower loading environments than those for which the wind turbine was originally designed, however, there may be a significant load design margin between the maximum load limit and the total loading capability. The design characteristics of the extensions 102 thus allow for increasing the loading capability of the rotor blades 16 within the maximum load limit, such that the total loading capability of the rotor blades 16 approaches or reaches the maximum load limit. This advantageously allows for increased power output from wind turbines that, for example, were designed using outdated design parameters or are being utilized in lower loading environments.

A design characteristic may be, for example, extension length 120 or extension width 122. The length 120 may be, for example, in the range between 0% and 30%, 0% and 25%, 0% and 20%, or 0% and 15% of the span 44. The width 122 may be, for example, in the range between 0% and 30%, 0% and 25%, 0% and 20%, or 0% and 15% of the local chord. Another design characteristic may be extension curvature. Extension curvature is the curvature of any curvilinear portion of the extension 102, such as in the generally chord-wise direction. Another design characteristic may be chord-wise extension location. The chord-wise extension location may, in some embodiments, define the chord-wise amount or ratio of the extension that is on or within the rotor blade 16 boundaries versus off or out of the rotor blade 16 boundaries. Another design characteristic may be span-wise extension location. For example, an extension may be location in the inner board area 52 or outer board area 54 of the rotor blade 16. Another design characteristic may be extension angle 124 with respect to chord line 126 of the rotor blade 16. The chord line for the rotor blade 16 may be established using any suitable known technique, and may further be determined at any suitable local chord for the rotor blade 16. The extension angle 124 is the angle between the chord line 126 and a line tangent to a point of contact 128 between the extension 102 and rotor blade 16. The extension angle 124 may be, for example, in the range between 40 degrees and −40 degrees, 30 degrees and −30 degrees, 20 degrees and −20 degrees, or 10 degrees and −10 degrees.

In some embodiments, as shown in FIGS. 2 and 3, the rotor blade assembly 100 further includes a gurney flap 130. The gurney flap 130 may extend from the extension 102. In some embodiments, the gurney flap 130 may be connected to the extension 102 using a suitable mechanical fastener, bond layer, or other suitable connecting apparatus. In other embodiments, the gurney flap 130 may be integral with the extension 102, as shown.

Gurney flaps 130 according to the present disclosure may have one or more design characteristics that are configured for increasing the loading capability of the rotor blade 16. In other words, such design characteristics increase the loading capability, and thus, the lift capability, of the rotor blade 16 to which the gurney flap 130 is connected. Further, the design characteristics are configured for increasing the loading capability within an established maximum load limit for the wind turbine 10. The maximum load limit may be established during design, manufacture, and/or operation of the rotor blade 16 and wind turbine 10, and establishes the maximum total loading capability, typically with a built in factor of safety, for the wind turbine.

A design characteristic may be, for example, flap length 132 or flap height 134. The length 132 may be, for example, in the range between 0% and 30%, 0% and 25%, 0% and 20%, or 0% and 15% of the span 44. The height 134 may be, for example, in the range between 0% and 15%, 0% and 12%, 0% and 10%, or 0% and 5% of the local chord. Another design characteristic may be chord-wise flap location. The chord-wise flap location may, in some embodiments, define the distance between the gurney flap 130 and the extension 102. Another design characteristic may be span-wise extension location. For example, a gurney flap 130 may be located in the inner board area 52 or outer board area 54 of the rotor blade 16. Another design characteristic may be flap angle 136 with respect to chord line 126 of the rotor blade 16. The chord line for the rotor blade 16 may be established using any suitable known technique, and may further be determined at any suitable local chord for the rotor blade 16. The flap angle 136 is the angle between the chord line 126 and the flap 130 generally. In some embodiments, the gurney flap 130 may extend generally perpendicularly to the chord line 126 of the rotor blade 16. In other embodiments, the gurney flap 130 may extend at any suitable angle 136 to the chord line 126.

In some embodiments, the gurney flap 130 may further include a flap adjustment plate 140. The flap adjustment plate 140 may be mounted to the gurney flap 130, and may increase the height 134 of the gurney flap 130. The flap adjustment plate 140 may be permanently mounted to the gurney flap 130, or may be temporarily mounted to the gurney flap 130. For example, the flap adjustment plate 140 may be mounted to the gurney flap during specific time periods, such as periods of relatively lower loading or expected lower loading on the rotor blade 16. These periods may be time-based, month-based, season-based, or otherwise.

It should be understood that extensions 102 according to the present disclosure may be connected to rotor blades 16 during the manufacture of the rotor blade 16, or may be retro-fit to existing rotor blades 16, to form rotor blade assemblies 100.

The present disclosure is further directed to a method for increasing a loading capability of a rotor blade 16 within a maximum load limit for a wind turbine 10. The method may include connecting an extension 102 to the rotor blade 16, as discussed above. The rotor blade 16 may be connected to a wind turbine 10, and the wind turbine 10 may be provided in a low loading environment relative to the maximum load limit for the wind turbine. The method may further include rotating the rotor blade 16 on the wind turbine 10, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
a rotor blade having surfaces defining a pressure side, a suction side, a leading edge, and a trailing edge extending between a tip and a root;
an extension connected to a surface of the rotor blade, the extension having at least one design characteristic configured for increasing a loading capability of the rotor blade within a maximum load limit for the wind turbine;
a gurney flap extending from the extension; and
a flap adjustment plate mounted to the gurney flap, the flap adjustment plate increasing a height of the gurney flap,
wherein the design characteristic is one of extension length, extension width, extension curvature, span-wise extension location, chord-wise extension location, or extension angle with respect to a chord line of the rotor blade.

2. The rotor blade assembly of claim 1, wherein the extension is an extension plate.

3. The rotor blade assembly of claim 2, wherein at least a portion of the extension plate in the generally chord-wise direction is planar.

4. The rotor blade assembly of claim 2, wherein at least a portion of the extension plate in the generally chord-wise direction is curvilinear.

5. The rotor blade assembly of claim 1, wherein the extension is an auxiliary airfoil section.

6. The rotor blade assembly of claim 1, wherein the extension is mounted on a surface of the rotor blade.

7. The rotor blade assembly of claim 6, further comprising a bond layer disposed between the extension and the rotor blade, the bond layer bonding the extension to the rotor blade.

8. The rotor blade assembly of claim 7, wherein the bond layer has a shear modulus approximately equal to or less than 5 gigapascals.

9. The rotor blade assembly of claim 7, wherein the bond layer comprises at least one of an epoxy, a polyurethane, a methacrylate, and an acrylic.

10. The rotor blade assembly of claim 7, wherein the bond layer comprises an inner acrylic foam layer disposed between opposing outer adhesive layers.

11. The rotor blade assembly of claim 1, wherein the gurney flap extends generally perpendicularly to the chord line of the rotor blade.

12. The rotor blade assembly of claim 1, wherein the gurney flap has at least one design characteristic configured for increasing the loading capability of the rotor blade within the maximum load limit for the wind turbine, and wherein the design characteristic is one of flap length, flap height, span-wise flap location, chord-wise flap location, or flap angle with respect to the chord line.

13. The rotor blade assembly of claim 1, further comprising a plurality of extensions.

14. A wind turbine, comprising:
a plurality of rotor blades, each of the plurality of rotor blades having surfaces defining a pressure side, a suction side, a leading edge, and a trailing edge extending between a tip and a root;
an extension connected to a surface of one of the plurality of rotor blades, the extension having at least one design characteristic configured for increasing a loading capability of the rotor blade within a maximum load limit for the wind turbine;
a gurney flap extending from the extension; and a flap adjustment plate mounted to the gurney flap, the flap adjustment plate increasing a height of the gurney flap, wherein the design characteristic is one of extension length, extension width, extension curvature, span-wise extension location, chord-wise extension location, or extension angle with respect to a chord line of the rotor blade.

15. The wind turbine of claim 14, wherein the extension is an extension plate.

16. The wind turbine of claim 14, wherein the extension is mounted on a surface of the rotor blade.

* * * * *